United States Patent [19]
Yoshioka et al.

[11] Patent Number: 5,124,826
[45] Date of Patent: Jun. 23, 1992

[54] LIQUID CRYSTAL DEVICE

[75] Inventors: Toshifumi Yoshioka; Takashi Enomoto, both of Hiratsuka; Naoya Nishida, Hadano, all of Japan

[73] Assignee: Canon Kabushiki Kaisha, Tokyo, Japan

[21] Appl. No.: 626,737

[22] Filed: Dec. 13, 1990

Related U.S. Application Data

[60] Division of Ser. No. 552,860, Jul. 13, 1990, which is a continuation of Ser. No. 199,298, May 26, 1988, abandoned.

[30] Foreign Application Priority Data

May 28, 1987 [JP] Japan .................. 62-129994
May 6, 1988 [JP] Japan .................. 63-111337

[51] Int. Cl.$^5$ .......................................... G02F 1/1343
[52] U.S. Cl. .................................. 359/87; 359/54
[58] Field of Search ............... 350/336, 350 S, 341, 350/339 R; 359/54, 87

[56] References Cited

U.S. PATENT DOCUMENTS

| | | | |
|---|---|---|---|
| 4,297,004 | 10/1981 | Nishimura et al. | 350/336 |
| 4,326,929 | 4/1982 | Minezaka et al. | 204/15 |
| 4,639,089 | 1/1987 | Okada et al. | 350/350 SX |
| 4,707,079 | 11/1987 | Inoue | 350/339 R |
| 4,728,176 | 3/1988 | Tsuboyama et al. | 350/339 R |
| 4,747,671 | 5/1988 | Takahashi et al. | 350/336 |
| 4,778,259 | 10/1988 | Kitayama | 350/350 S |
| 4,818,078 | 4/1989 | Mouri et al. | 350/336 X |
| 4,879,059 | 11/1989 | Hanyu et al. | 350/350 S |

FOREIGN PATENT DOCUMENTS

| | | | |
|---|---|---|---|
| 0324433 | 7/1989 | European Pat. Off. | 350/336 |
| 0075454 | 6/1977 | Japan | 350/336 |
| 0006056 | 1/1978 | Japan | 350/336 |
| 0133432 | 8/1982 | Japan | 350/339 R |
| 0129833 | 7/1984 | Japan | 350/336 |
| 0210325 | 9/1986 | Japan | 350/336 |

*Primary Examiner*—Stanley D. Miller
*Assistant Examiner*—Anita Pellman Gross
*Attorney, Agent, or Firm*—Fitzpatrick, Cella, Harper & Scinto

[57] ABSTRACT

A liquid crystal device comprises two electrode plates and a liquid crystal such as a ferro-electric smectic liquid crystal disposed between the electrode plates. At least one electrode plate is provided with a uniaxial orientation treatment. At least one electrode plate comprises a substrate and transparent stripe electrodes and metal electrodes each disposed along the length of and electrically connected with a transparent stripe electrode formed on a substrate. Each metal electrode is disposed along and forms a protrusion sticking out of at least one longitudinal edge of a transparent stripe electrode.

2 Claims, 2 Drawing Sheets

LIQUID CRYSTAL DEVICE

This application is a division of application Ser. No. 552,860, filed Jul. 13, 1990 which is continuation of Ser. No. 199,298, filed May 26, 1988, now abandoned.

FIELD OF THE INVENTION AND RELATED ART

The present invention relates to a liquid crystal display panel of a large area (e.g., A-5 size or larger according to JIS (Japanese Industrial Standards)), particularly a liquid crystal display panel of a large area using ferroelectric smectic liquid crystal.

Hitherto, only transparent electrodes arranged in the form of stripes on a substrate have been generally used as an electrode arrangement, in a liquid crystal display devices, particularly a simple dot matrix-type liquid crystal display device.

When such electrodes are used in a liquid crystal display device of a large area and a high degree of fineness, however, the length of a stripe electrode in the longitudinal direction becomes large to result in a large electrode resistance, which leads to several driving problems, such as delay of signals and deformation of driving signal waveforms. For this reason, a metal electrode of a metal with a relatively small resistivity such as Al has been additionally used.

Such a metal electrode has been disposed along and electrically connected with the length of a transparent stripe electrode by vapor-depositing a metal film over transparent stripe electrodes formed on a substrate and subjecting the metal film to photolithography-etching treatment to form thin or narrow metal electrodes each along a transparent stripe electrode.

The narrow metal electrode thus formed by an ordinary photolithography-etching treatment has actually assumed not a form as shown in FIG. 4 disposed along the longitudinal edge of a transparent electrode but a form as shown in FIG. 5.

More specifically, according to the structure shown in FIG. 4, the edge $2a$ of a transparent stripe electrode 2 conforms to the edge $3a$ of a narrow metal electrode 3. Actually, however, a minute pixel portion A has been formed by an edge portion $2a$ of a transparent stripe electrode in addition to a main pixel portion P as shown in FIG. 5. The minute pixel portion A is formed by a distance d on the order of 2–8 $\mu$m between the edge $2a$ of the transparent stripe electrode 2 and the edge $3a$ of the narrow metal electrode 3.

Incidentally, in order to form a monodomain of a ferroelectric smectic liquid crystal, a uniaxial orientation treatment such as rubbing is suitable. Such a uniaxial orientation treatment is disclosed in U.S. Pat. No. 4,639,089, etc.

However, it has been found that a rubbing treatment, particularly a rubbing treatment effected in the direction forming an angle of 90° with respect to the lengthwise extension of a transparent stripe electrode 2, results in a difference in orientation state or performance between the main pixel portion P and the minute pixel portion A where two steps are formed by the edge $2a$ of a transparent stripe electrode 2 and the edge $3a$ of a narrow metal electrode in response to the rubbing. Thus, the monodomain formation characteristic at the minute pixel portion A is poorer than that at the main pixel portion P, so that the threshold responsive characteristic at the minute pixel portion A is liable to be slower than that at the main pixel portion P. This leads to a problem of after image in the case of a motion picture or scrolling as the electrooptical response at the minute pixel portion A can be recognized to a viewer if the breadth d of the minute pixel portion A is 3 $\mu$m or wider.

SUMMARY OF THE INVENTION

An object of the present invention is to solve the above-mentioned problems, particularly a ferroelectric smectic liquid crystal device having solved a problem of after image at the time of motion picture display or smooth scrolling display of character images.

According to the present invention, there is provided a liquid crystal device comprising two electrode plates, at least one of which is provided with a uniaxial orientation treatment, at least one of the two electrode plates comprising a substrate and transparent stripe electrodes and metal electrodes each disposed electrically connected with and along the length of a transparent stripe electrode on the substrate; the improvement wherein each of the metal electrode is disposed along and forms a protrusion sticking out of at least one longitudinal edge of a transparent stripe electrode.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

Figure 1A:
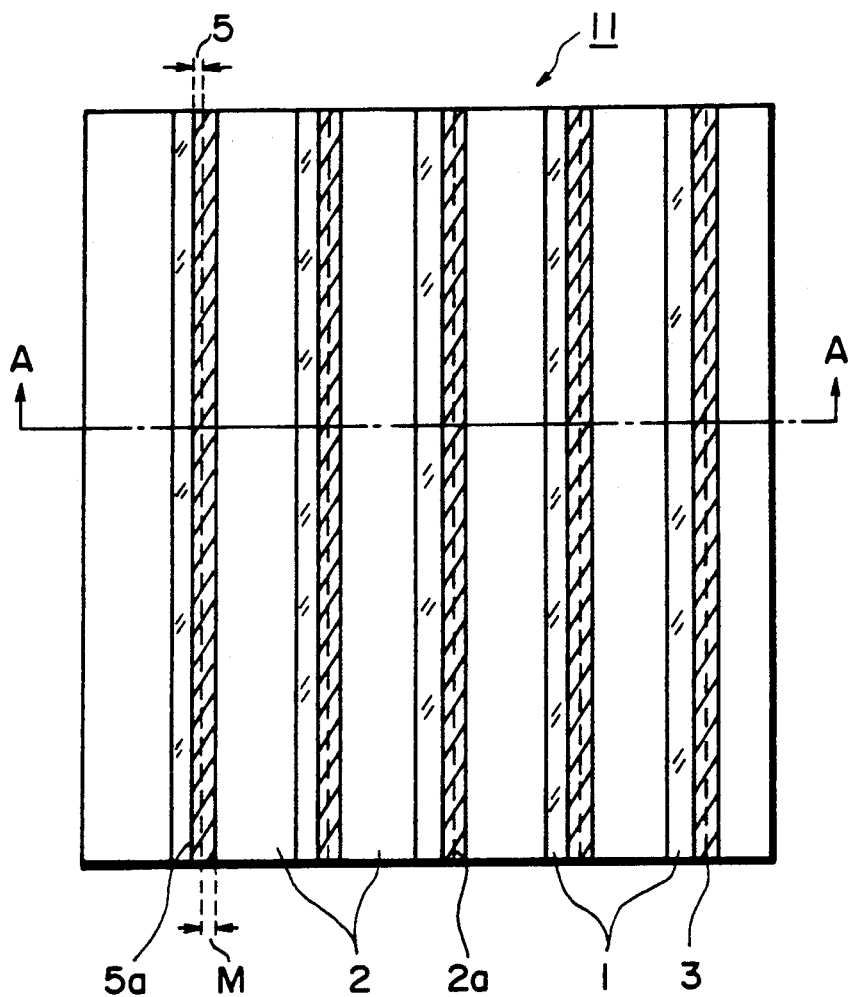
FIG. 1A is a plan view of an electrode plate used in the present invention.
Figure 1B:
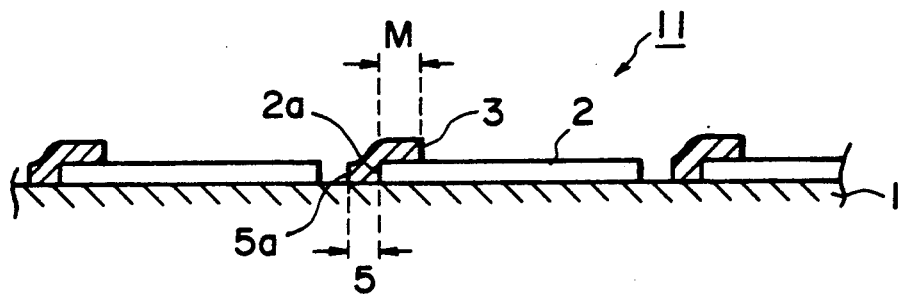
FIG. 1B is a sectional view taken along the line A—A in FIG. 1A.

FIGS. 1A and 1B are a plan view and a sectional view of an electrode plate in an embodiment of the liquid crystal device according to the present invention. Referring to FIGS. 1A and 1B, an electrode plate 11 comprises a substrate formed of glass or plastic, transparent stripe electrodes 2 having edges $2a$ and narrow metal electrodes 3 each disposed along and having a protrusion 5 sticking out of an edge $2a$ of a transparent stripe electrode 2.

The edge $5a$ of a protrusion 5 is disposed at a position free of electrical contact with a neighboring transparent stripe electrode 2, and the protrusion 5 has a width of generally 3–10 $\mu$m, preferably 5–7 $\mu$m. The narrow metal electrode 3 may preferably have a width of about 5–20 $\mu$m and a thickness of about 500–5000 Å. A transparent stripe electrode 2 and a narrow metal electrode 3 forms a lapping portion M having a width of about 0.5–10 $\mu$m, preferably about 1–5 $\mu$m. A smaller lapping width can provide a larger aperture ratio. The transparent stripe electrode may comprise a film of $SnO_2$, $In_2O_3$ or $In_2O_3/SnO_2$ (=ITO, indium-tin-oxide). The narrow metal electrode 3 may comprise a film of a metal, such as aluminum, molybdenum, chromium, titanium and tungsten or an alloy of these metals such as Ni-Cr.

The electrode plate 11 is coated further with an alignment control film (not shown) for controlling the alignment state of a ferroelectric smectic liquid crystal. The alignment control film has been provided with a uniaxial orientation treatment, such as rubbing, oblique vapor deposition or oblique etching. The alignment control film may be formed of at least one species of an organic resin, such as polyimide, polyamide-imide, polyester-imide, polyether-imide, polyamide, polyvinyl alcohol, polyethylene and polyester. Such an alignment control film may be formed in a thickness of 50 Å - 5000 Å preferably 100 Å - 2000 Å.

Further, in a preferred embodiment of the present invention, the electrode plate 11 is first coated with an insulating film of an inorganic insulating material, such as SiO, $SiO_2$ and $TiO_2$ and then with an alignment control film of an organic resin film as described above. The insulating film may be formed in a thickness of 500 Å - 5000 Å preferably 1000 Å - 2000 Å.

Figure 2:
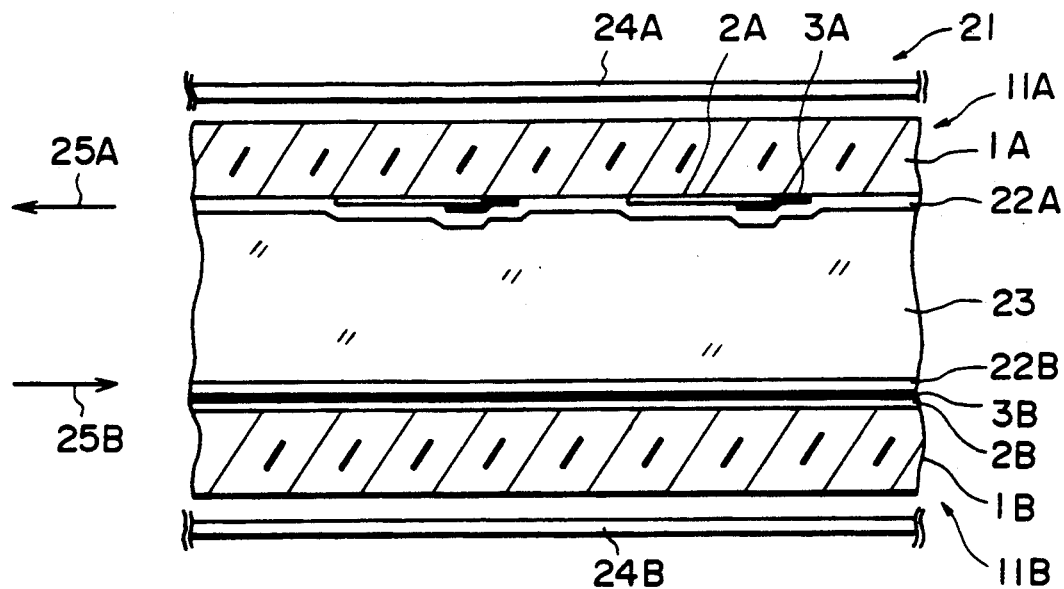
FIG. 2 is a sectional view of a liquid crystal device according to the present invention.

FIG. 2 is a sectional view of a ferroelectric smectic liquid crystal device 21 incorporating a pair of electrode plates 11 (upper side: 11A, lower side 11B) as described above.

The electrode plates 11A and 11B respectively comprise substrates 1A and 1B coated with transparent stripe electrodes 2A and 2B, narrow metal electrodes 3A and 3B, and alignment control films 22A and 22B, respectively. The transparent stripe electrodes 2A and 2B are disposed to intersect each other at an angle of 90°. The alignment control films 22A and 22B formed on the two substrates are provided with uniaxial orientation axes 25A and 25B in mutually reverse parallel directions as indicated by arrows 25A and 25B and in parallel with the extension of the longitudinal edges of the transparent stripe electrodes 2B.

In this instance, the uniaxial orientation axis imparted to the upper electrode plate 11A intersect with the longitudinal edges of the transparent stripe electrodes 2A at an angle of 90°, but the transparent stripe electrodes 2A are free of minute pixel portions as mentioned above, so that the problem of after image at the time of display is not caused.

A ferroelectric smectic liquid crystal 23 is disposed between the electrode plates 11A and 11B of the ferroelectric smectic liquid crystal device 21. The ferroelectric smectic liquid crystal 23 may for example be selected from those disclosed in U.S. Pat. Nos. 4561726; 4589996; 4592858; 4596667; 4613209; 4614609; 4638073; and 4725688. By setting the spacing between the electrode plates 11A and 11B to be sufficiently small as disclosed by U.S. Pat. No. 4367924, etc., the formation of the helical alignment structure of the ferroelectric smectic liquid crystal is suppressed, thereby to provide bistability.

The above-mentioned ferroelectric smectic liquid crystal 23 provides an electro-optical response. In this instance, polarizers 24A and 24B disposed in cross nicols or parallel nicols may be used as an optical detection means.

Figure 3:
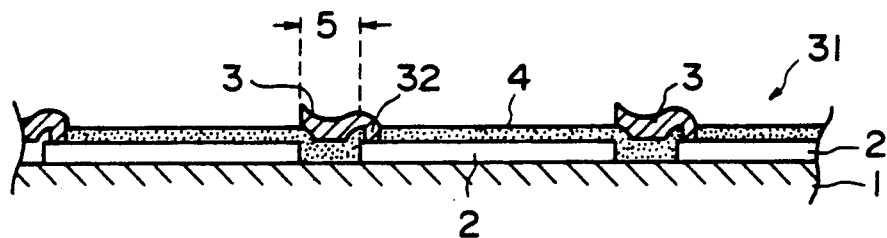
FIG. 3 is a sectional view of another electrode plate used in the present invention.

FIG. 3 is a sectional view of another electrode plate 31 used in the present invention, wherein like parts are denoted by like reference numerals as in FIG. 1. The electrode plate 31 shown in FIG. 3 may be prepared by forming an insulating film 4 of SiO, $SiO_2$, $TiO_2$, etc., for example, by vapor deposition, coating the insulating film except for portions thereof providing through holes 32 with a photoresist mask, subjecting the coating films to plasma etching to form through holes, and then further coating thereon a metal film by vapor deposition of a metal, followed by etching to form narrow metal electrodes electrically connected with the transparent stripe electrodes 2 and having projection 5. The narrow metal electrode 3 is disposed to cover a spacing between an adjacent pair of transparent stripe electrodes 2 so that it also shows the effect of a black stripe line.

Hereinbelow, the present invention will be explained in more detail based on specific examples.

EXAMPLE 1

A glass substrate measuring 320 mm × 300 mm was coated with a 1000 Å-thick ITO film which was then patterned by photolithography to form a pattern of ITO stripe electrodes at a pitch of 305 μm and a line breadth of 255 μm on a whole surface. Then, a 2000 Å-thick Al film was formed thereon and patterned into narrow metal electrodes 3 as shown in FIGS. 1A and 1B at a pitch of 305 μm and with a line breadth of 12 μm including a lapping breadth of 6 μm. The alignment error at this time was ±4 μm. The electrode plate thus prepared was further coated with a 0.1 μm-thick $SiO_2$ film by vapor deposition and then with a 100 Å-thick polyimide film formed by applying a 5 wt. % solution in N-methylpyrrolidone of a polyamic acid (dehydrocondensation product of pyromellitic acid dianhydride and 4,4'-diaminodiphenyl ether) followed by heating at a temperature above 250° C.

Two electrode plates were prepared and treated in the above-described manner. One electrode plate was rubbed in the direction of the longitudinal edges of the transparent stripe electrodes (in the direction of the arrow 25B in FIG. 2). The other electrode plate was rubbed in the direction intersecting the longitudinal edges of the transparent stripe electrodes at an angle of 90° (in the direction of the arrow 25A in FIG. 2).

The two electrode plates were superposed on each other so that their extension directions of the longitudinal edges of the transparent stripe electrodes crossed each other at an angle of 90° and a gap of 1.5 μm was held between the two electrode plates by disposing $SiO_2$ beads with an average diameter of 1.5 μm to prepare a blank cell. A ferroelectric smectic liquid crystal "CS-1017" (trade name, available from Chisso K.K.) in isotropic phase was charged into the cell and gradually cooled at a rate of 0.5° C./hr successively from isotropic phase, through choleteric phase and smectic A phase into chiral smectic C phase to prepare a bistable ferroelectric smectic liquid crystal device.

The liquid crystal device was observed through a polarizing microscope at a magnification of 500, whereby a monodomain of a chiral smectic phase with its helical structure having been released was observed.

Further, the liquid crystal device was connected with a multiplex driving apparatus and subjected to scrolling display of a character image, whereby no after image was observed.

COMPARATIVE EXAMPLE 1

A ferroelectric smectic liquid crystal device for comparison was prepared in the same manner as in Example 1 except that two electrodes were prepared in the following manner.

Figure 4:
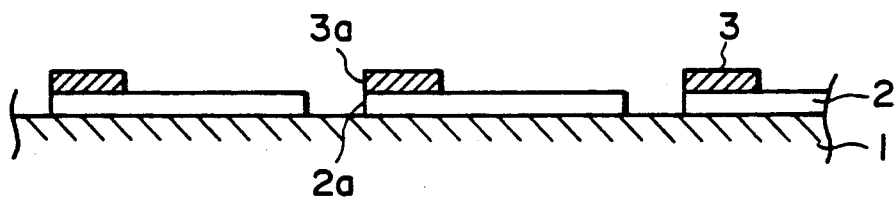
FIGS. 4 and 5 are sectional views of electrode plates outside the present invention.
Figure 5:
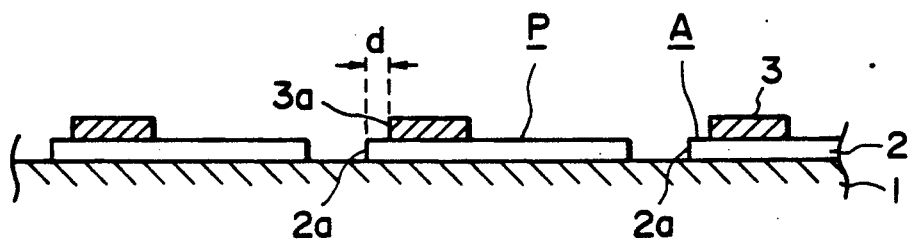

A glass substrate measuring 320 mm × 300 mm was coated with a 1000 Å-thick ITO film which was then patterned by photolithography to form a pattern of ITO stripe electrodes at a pitch of 305 μm and with a line breadth of 285 μm on a whole surface. Then, a 2000 Å thick Al film was formed thereon and patterned by photolithography-etching so as to provide a structure as shown in FIG. 4 wherein narrow metal electrodes 3 were intended to be formed at a pitch of 305 μm and with a line breadth of 12 μm giving the lapping breadth of 12 μm (i.e. intended so that the longitudinal edges of each ITO electrode and each Al electrode were aligned with each other). As a result, an alignment error of ±4 μm occurred, whereby minute pixel portions A having a breadth of 4 μm at the maximum as shown in FIG. 5 were actually formed.

The liquid crystal device for comparison thus prepared was evaluated in the same manner as in Example 1, whereby different domains were observed at main pixel portions and minute pixel portions and noticeable after image was observed during scrolling display of a character image.

As described above, according to the present invention, there is provided a liquid crystal device which does not cause after image during motion picture display or smooth scrolling display of character images and provides a picture of a high luminance based on an increase in aperture rate on a screen.

What is claimed is:

1. A process for producing a liquid crystal device, comprising the steps of:
    (a) providing two glass substrates, each coated with a film of indium-tin-oxide, (b) patterning the indium-tin-oxide film by photolithography into stripes having a prescribed width disposed at a prescribed pitch,
    (c) forming a film of aluminum over the stripes of indium-tin-oxide,
    (d) patterning the aluminum film to leave aluminum stripes each extending along the length of an associated indium-tin-oxide stripe and having a portion overlying a part including a longitudinal edge of the associated indium-tin-oxide stripe in a width narrower than the width of the associated indium-tin-oxide stripe and a portion overlying apart of the glass substrate adjacent to the longitudinal edge of the associated indium-tin-oxide,
    (e) forming an insulating film and a polyimide film over the glass substrate after the step (d),
    (f) rubbing the polyimide film on one of the two substrate sin a direction parallel to the lengths of the indium-tin-oxide stripes thereon, and rubbing the polimide film on the other of the two substrates in a direction perpendicular to the lengths of the indium-tn-oxide stripes thereon, said perpendicular direction extending across each indium-tin-oxide strip from its longitudinal edge overlain by an associated one of the aluminum stripes to its opposite longitudinal edge not overlain by an associated one of the aluminum stripes,
    (g) superposing the two glass substrates on each other to leave a gap therebetween; and
    (h) injecting a liquid crystal to dispose the liquid crystal between the two substrates.

2. A process according to claim 1, wherein said liquid crystal is a chiral smectic liquid crystal.

* * * * *

UNITED STATES PATENT AND TRADEMARK OFFICE
CERTIFICATE OF CORRECTION

PATENT NO. : 5,124,826

DATED : June 23, 1992

INVENTOR(S) : TOSHIFUMI YOSHIOKA, ET AL.

Page 1 of 2

It is certified that error appears in the above-identified patent and that said Letters Patent is hereby corrected as shown below:

COLUMN 1

Line 5, "cl" should be deleted.

COLUMN 2

Line 21, "electrode" should read --electrodes--.

COLUMN 3

Line 35, "intersect" should read --intersects--.
    Line 45, "U.S. Pat. Nos. 4561726;" should read
        --U.S. Pat. Nos. 4,561,726;--.
    Line 46 should read --4,589,996; 4,592,858; 4,596,667;
        4,613,209; 4,614,609; 4,638,073;--.
    Line 47, "4725688." should read --4,725,688.--.
    Line 49, "U.S. Pat. No. 4367924," should read
        --U.S. Pat. No. 4,367,924,--.

COLUMN 4

Line 45, "choleteric" should read --cholesteric--.
    Line 66, "2000 Å" should read --2000 Å- --.

COLUMN 5

Line 27, "(b)" should read --¶ (b)--.

COLUMN 6

Line 9, "apart" should read --a part--.
    Line 15, "substrate sin" should read --substrates in--.

UNITED STATES PATENT AND TRADEMARK OFFICE
CERTIFICATE OF CORRECTION

PATENT NO. : 5,124,826
DATED : June 23, 1992
INVENTOR(S) : TOSHIFUMI YOSHIOKA, ET AL.

It is certified that error appears in the above-identified patent and that said Letters Patent is hereby corrected as shown below:

<u>COLUMN 6</u>

Line 17, "polimide" should read --polyimide--.
Line 19, "indium-tn-oxide" should read --indium-tin-oxide--.
Line 21, "strip" should read --stripe--.

Signed and Sealed this

Twenty-eighth Day of September, 1993

Attest:

BRUCE LEHMAN

Attesting Officer     Commissioner of Patents and Trademarks